United States Patent
Ishihara

(10) Patent No.: US 8,640,559 B2
(45) Date of Patent: Feb. 4, 2014

(54) INSTRUMENT APPARATUS

(75) Inventor: Hideo Ishihara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 362 days.

(21) Appl. No.: 12/926,871

(22) Filed: Dec. 15, 2010

(65) Prior Publication Data

US 2011/0154897 A1 Jun. 30, 2011

(30) Foreign Application Priority Data

Dec. 24, 2009 (JP) ................................. 2009-293004

(51) Int. Cl.
*G01D 7/00* (2006.01)
(52) U.S. Cl.
USPC ......................................................... 73/866.3
(58) Field of Classification Search
USPC ......................................................... 73/866.3
See application file for complete search history.

(56) References Cited

FOREIGN PATENT DOCUMENTS

JP 2007-147566 A 6/2007

OTHER PUBLICATIONS

Japanese Office Action mailed on Aug. 6, 2013 for corresponding Japanese Patent Application No. 2009-293004.

*Primary Examiner* — Hezron E Williams
*Assistant Examiner* — Paul West
(74) *Attorney, Agent, or Firm* — Edwards Wildman Palmer LLP

(57) ABSTRACT

An instrument apparatus, includes a tachometer having a chaptering plate provided at a front surface thereof; a display unit arranged at the front surface of the chaptering plate; a printed circuit board arranged at a rear surface of the chaptering plate and driving the display unit. The display unit includes a projecting portion projecting toward the chaptering plate and a male terminal provided at a top end of the projecting portion. The chaptering plate includes an insertion hole formed into a similar shape as an outline of the projecting portion, in which the projecting portion is inserted. The printed circuit board is arranged at a position, in which an insert direction of inserting the projecting portion through the insertion hole and the printed circuit board intersect, and includes a female terminal to be fitted and electrically connected with the male terminal.

2 Claims, 4 Drawing Sheets

INSTRUMENT APPARATUS

TECHNICAL FIELD

This invention relates to an instrument apparatus mounted at a movable body such as a vehicle or shipping, especially to an instrument apparatus having a display device showing predetermined information.

BACKGROUND ART

In the movable body such as the vehicle or shipping, an instrument apparatus showing information measured by various measuring devices for a crew of the movable body. An analogue instrument apparatus, which, for example, rotates an indicating needle in accordance with a measuring value measured by the various measuring devices so as to point an index member showing various condition of the movable body at a chaptering plate by the indicating needle, so that the measuring value is shown for the crew of the movable body, is used as the instrumental apparatus.

The analogue instrumental apparatus includes a box-shaped instrument case; a chaptering plate mounted at a crew side of the instrument case, and having an index member showing various condition of the movable body; an indicating needle arranged at a side of front surface (crew side) of the chaptering plate; a printed circuit board received in the instrument case and being provided with various electronic components such as a movement rotating the indicating needle in according with the measuring value and a plurality of light sources; and an inside member covering an area to be hidden at the chaptering plate.

As the above analogue instrumental apparatus, an instrumental apparatus (see, for example, Patent document 1) including a display device showing various information indicating vehicle conditions, such as a traveling distance, for showing a display to give a flesh feeling to the crew.

The instrumental apparatus described in Patent document 1 includes a display device displaying the information such as a LCD panel; a light guide body arranged at a rear side of the display device and leading light from the light source toward the display device; a frame receiving the display device and the light guide body, and a cover member mounted at the frame and having an exposure member exposing a display surface of the display device. The display device includes a connecting member such as a FPC led out of the display device. The connecting member is led from the frame and electrically connects the display device and the printed circuit board.

In the instrumental apparatus structured as described above, by arranging the display device to show a condition of the vehicle so as to cover around a rotating center of the indicating needle, the displayed appearance is given a stereoscopic effect and improved.

CITATION LIST

Patent Document 1: Japan Patent Publication Application No. 2007-147566

SUMMARY OF INVENTION

Objects to be Solved

In the instrumental apparatus disclosed in the Japan Patent Publication Application, after arranging the display device so as to cover the rotating center of the indicating needle, a connecting member led from the display device received in the frame of the display device is pulled out of the frame and connected to the printed circuit board. Therefore, steps of working process for assembling the display device are increased and manufacturability is decreased. Additionally, larger working area for connecting by a worker is required so that miniaturizing the instrumental apparatus is hindered.

According to the above problems, an object of the present invention is to provide an instrumental apparatus, which simplifies work of assembling the display device, and can be easy to be miniaturized.

How to Attain the Object of the Present Invention

In order to overcome the above problems and attain the object, the present invention is to provide an instrument apparatus, which includes a first display device having a chaptering plate, on a front surface of which an index member for showing a condition of a movable body in cooperation with an indicating needle; a second display device arranged at a side of the front surface of the chaptering plate; a circuit board arranged at a side of a rear surface of the chaptering plate and driving the second display device. The second display device includes a projecting portion projecting toward the chaptering plate and a connecting terminal provided at a top end of the projecting portion. The chaptering plate includes an insertion hole having a shape similar to an outline of the projecting portion so as to insert the projecting portion therethrough. The circuit board is arranged at a position, in which an insert direction of inserting the projecting portion through the insertion hole intersects the circuit board, and includes a terminal receiving member, to which the connecting terminal is fitted and electrically connected.

In the invention mentioned above, the instrument apparatus includes an instrument case, on a front surface of which the chaptering plate is mounted, receiving the circuit board therein. The projecting portion is provided at the top end of the projecting portion with a boss projecting from the top end. The instrument case includes a positioning hole, in which the boss is inserted so as to position the connecting terminal and the terminal receiving member corresponding to each other in the insert direction when the projecting portion is inserted in the insertion hole.

According to the invention mentioned above, the circuit board is arranged at the position, in which the insert direction of inserting the projecting portion of the second display device through the insertion hole of the chaptering plate intersects the circuit board, and includes the terminal receiving member, to which the connecting terminal provided at the top end of the projecting portion is fitted and electrically connected, so that, by inserting the projecting portion of the second display device through the insertion hole of the chaptering plate, the second display device and the circuit body can be electrically connected with the connecting terminal and the terminal receiving member.

According to the invention mentioned above, the projecting portion is provided with the boss projecting from the top end of the projecting portion, and the positioning hole, in which the boss is inserted so as to position the connecting terminal and the terminal receiving member corresponding to each other in the insert direction when the projecting portion is inserted in the insertion hole, is provided at the instrument case, so that by inserting the projecting portion through the insertion hole, the connecting terminal and the terminal receiving member can be positioned corresponding to each other with the boss and the positioning hole.

Effects of the Invention

According to the present invention, as mentioned above, by inserting the projecting portion of the second display device through the insertion hole of the chaptering plate, the second display device and the circuit body can be electrically connected with the connecting terminal and the terminal receiving member. Thereby, operation of mounting the second display device can be simplified. No operation space for electrically connecting the second display device and the circuit board by an operator is required, so that the instrument apparatus can be miniaturized.

According to the present invention, by inserting the projecting portion through the insertion hole, the connecting terminal and the terminal receiving member can be positioned corresponding to each other by the boss and the positioning hole. Thereby, the connecting terminal and the terminal receiving member can be smoothly fitted and operability of mounting can be improved. The connecting terminal and the terminal receiving member can be securely fitted to each other and fitting error of the connecting terminal and the terminal receiving member can be prevented.

DESCRIPTION OF EMBODIMENTS

An instrument apparatus of a first embodiment according to the present invention is described with reference to FIGS. 1-5. The instrument apparatus 1 of the first embodiment according to the present invention is mounted at a movable body such as an automobile for displaying a condition of the movable body toward a crew of the movable body.

Figure 1:
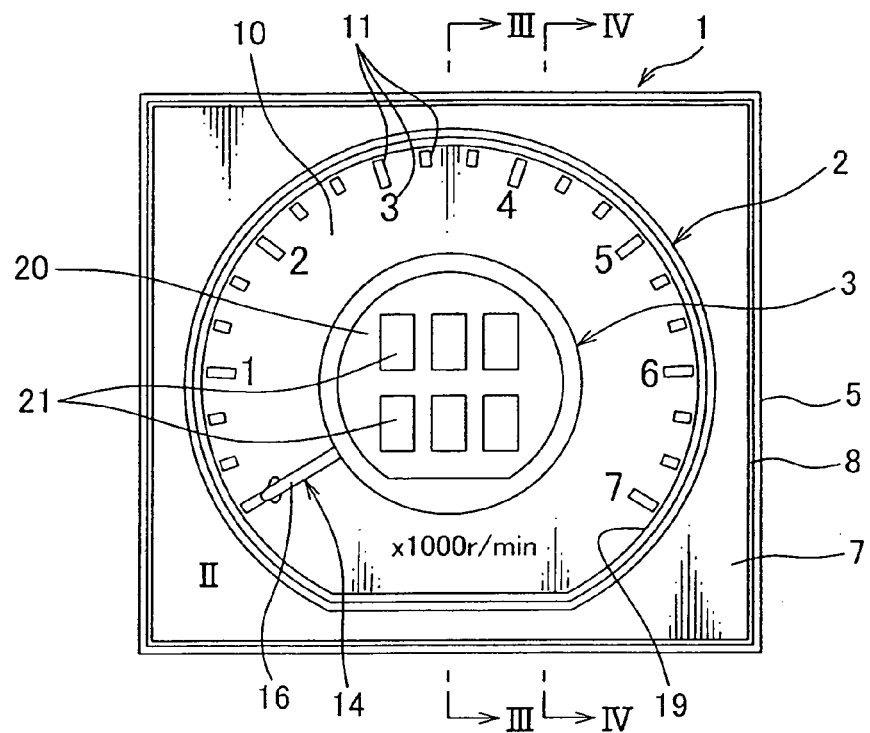
FIG. 1 is a plan view of an instrument apparatus including a first display device and a second display device according to the present invention.

The instrument apparatus 1, as shown in FIG. 1, includes a tachometer 2 as the first display device for showing a revolution speed of an engine of the movable body; a display unit 3 as the second display device for showing various information; a printed circuit board 4, on which various electronic components are mounted, as a circuit board; an instrument case 5 receiving the tachometer 2, the display unit 3 and the printed circuit board 4; a rear cover 6 covering a rear surface of the instrument case 5, which the rear surface is a side farther from a crew of the movable body; an inside member 7 arranged at a crew side, i.e. a side of a front surface, of the instrument case 5; and a transparent cover 8 covering a side of a front surface (crew side) of the inside member 7.

In the embodiment, for simplifying a description, the instrument apparatus includes only one tachometer 2 showing the revolution speed of engine of the movable body. The instrument apparatus can include a speed meter showing a moving speed of the movable body, a water temperature gauge showing water temperature of cooling water for the engine, and a fuel gauge showing fuel level of a fuel tank.

Figure 2:
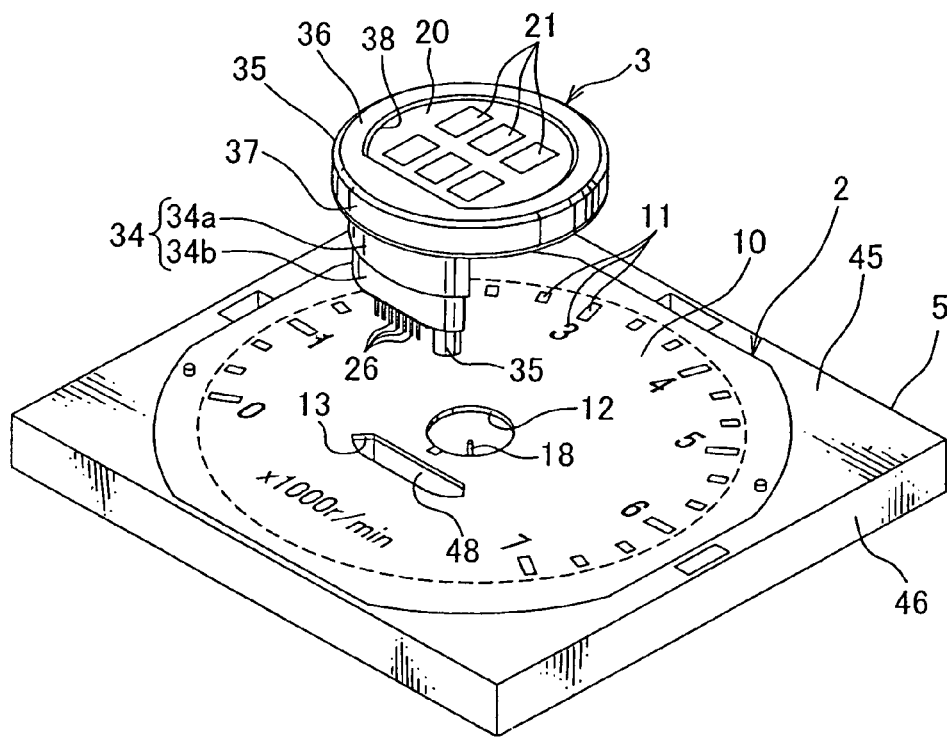
FIG. 2 is an exploded perspective view showing the first display device and the second display device shown in FIG. 1.

The tachometer 2, as shown in FIGS. 1 and 2, includes a chaptering plate 10 provided at a front surface (crew-side surface) thereof with an index member 11 of a scale, a numerical, a letter or a mark; an indicating needle 14 arranged at a side of the front surface (crew-side surface) of the chaptering plate 10; a movement 17 connected with the indicating needle 14; and a decorative ring 19 arranged so as to surround the index member 11 of the chaptering plate 10.

The chaptering plate 10 is formed into a disk shape with transparent synthetic resin. The chaptering plate 10 is provided at a front surface thereof with a light screen layer (not shown) and the index member 11 is formed by removing the light screen layer at an area corresponding to the index member 11. The index member 11 is arranged along an arc line corresponding to a rotatable range of the indicating needle 14. The chaptering plate 10 includes a guiding hole 12 guiding a later-described output shaft 18 of the movement 17 and leading light from a later-described LED 40 at the printed circuit board 4 therethrough, and an insertion hole 13 formed into a similar shape as an outline of a later-described projecting portion 34 of the display unit 3 so as to insert the projecting portion 34 therethrough.

The above-structured chaptering plate 10 is mounted at a front surface of a later-described front wall 45 of the instrument case 5 and the light, which passes forward through the index member 11 from a rear surface thereof, i.e. from the LED 40 at the printed circuit board 4, can be recognized by the crew (user) of the movable body.

The indicating needle 14 is made of a transparent material such as acryl resin, and includes a base end 15 as a center axis and an indicating portion 16 extending straightly from the base end 15 and indicating the index member 11. The base end 15 is positioned at a center area of the index member 11 of the chaptering plate 10 and the indicating needle 14 is attached at the output shaft 18 of the movement 17 so as to be arranged at the side of the front surface (crew side) of the chaptering plate 10. The indicating needle 14 is rotated together with the output shaft 18 of the movement 17.

The above-structured indicating needle 14 is rotated by the movement 17 in accordance with a measured value measured by engine revolution speed measuring means (not shown) so as to indicate the measured value together with the index member 11 arranged at the chaptering plate 10. When it is dark in the nighttime, the light from the LED 40 at the printed circuit board 4 is led to the base end 15 and the incident light is reflected toward a top end of the indicating portion 16, so that the indicating portion 16 of the indicating needle 14 is lightened.

Figure 3:
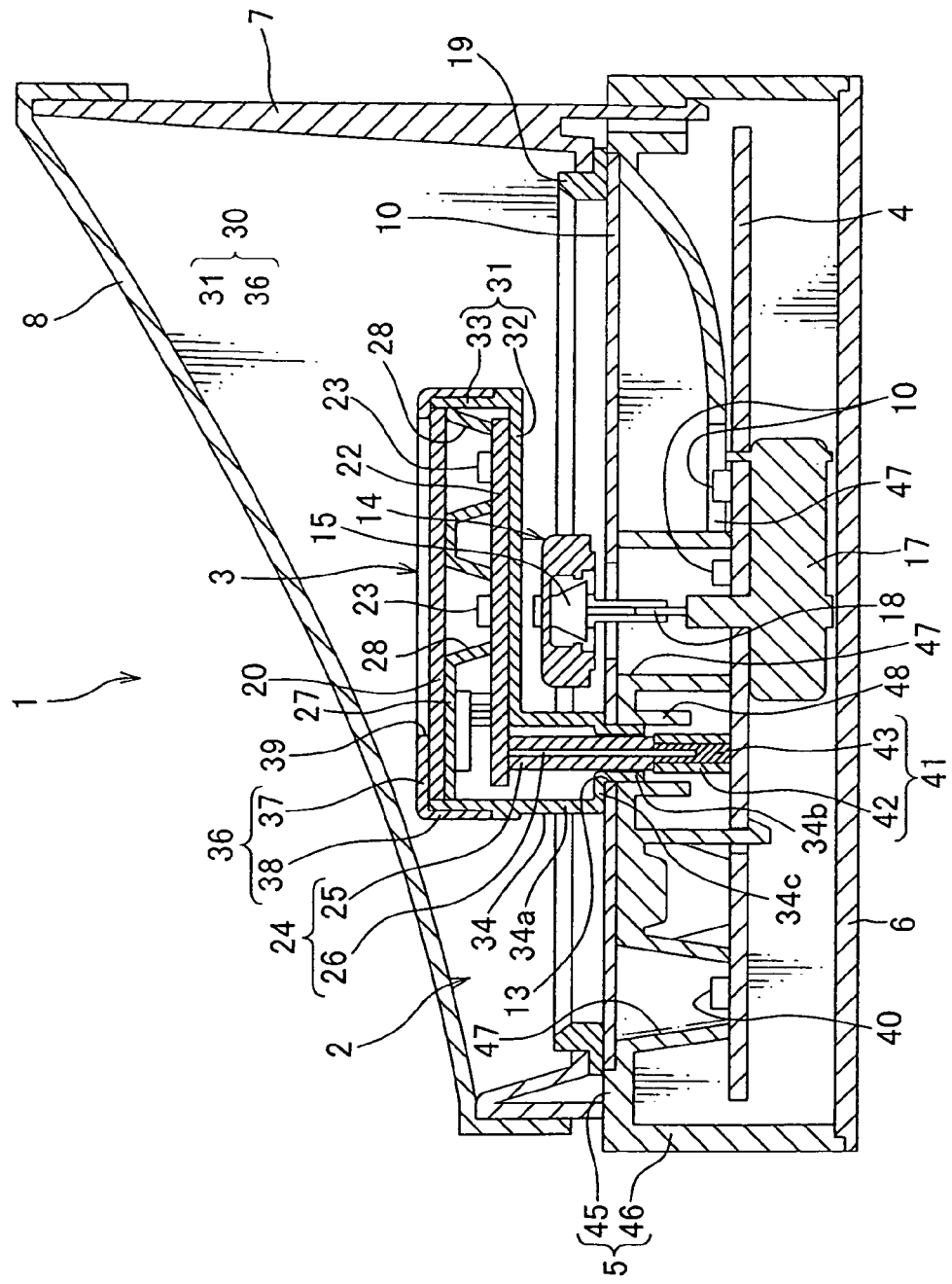
FIG. 3 is a cross-sectional view taken along the line shown in FIG. 1.

The movement 17, as shown in FIG. 3, is mounted at a rear surface of the printed circuit board 4, which rear surface is at a side far from the crew, and arranged in the instrument case 5, and connected to the engine revolution speed measuring means (not shown), which is mounted at the movable body. The movement 17 includes the output shaft 18 rotating in accordance with the measured value measured by the engine revolution speed measuring means.

The decorative ring 19, as shown in FIGS. 1 and 3, is formed into a ring shape in plan view, and attached at the front surface (crew side) of the chaptering plate 10 so as to surround an outer end of the index member 11 of the chaptering plate 10.

Figure 4:
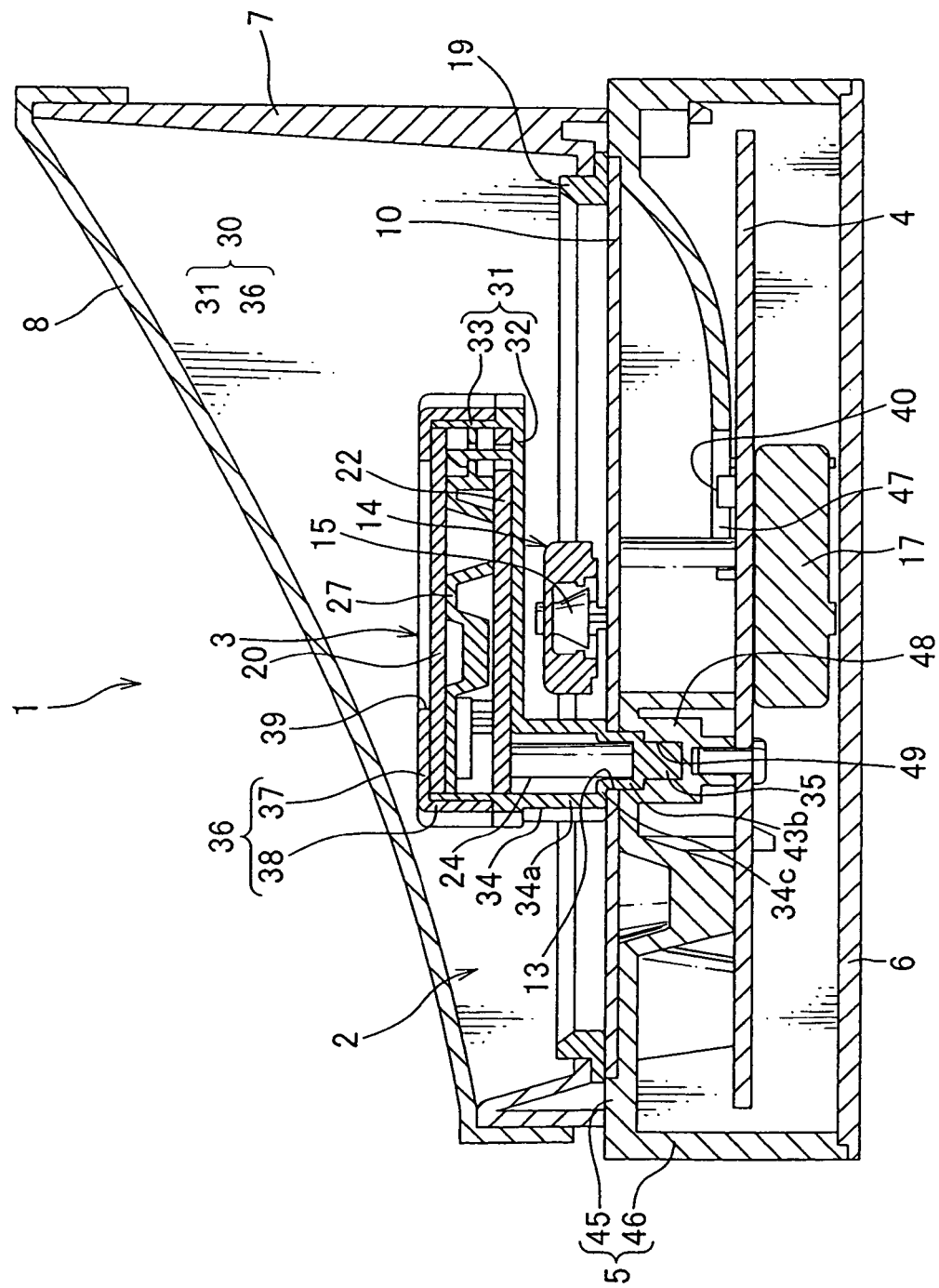
FIG. 4 is a cross-sectional view taken along the line IV-IV shown in FIG. 1.

The display unit 3, as shown in FIGS. 1 and 4, is arranged at the crew side of the base end 15 so as to cover the base end of the indicating needle 14. In other words, the display unit 3 is arranged at the side of the front surface (crew side) of the chaptering plate 10. The display unit 3 displays various information, such as a transmission shift position, a traveling distance, an average speed, a fuel level, and a warning.

The display unit 3, as shown in FIGS. 2-4, includes a display body 20 displaying a plurality of warnings 21, as the various information; a light source circuit board 22, on which a light source 23 lightening the display body 20 is mounted, being arranged at a side of a rear surface (far side from the crew) of the display body 20; a screening member 27 arranged between the display body 20 and the light source circuit board 22; and a receiving case 30 receiving the display body 20, the screening member 27 and the light source circuit board 22, which are stacked.

The display body 20 is formed into a disk shape with transparent synthetic resin. The display body 20 is provided at a surface thereof with a screen layer (not shown). By removing areas of the screen layer corresponding to the plurality of warnings 21, the plurality of warnings 21 is formed. By passing the light from the rear side. i.e. from the light source 23 through the plurality of warnings 21 toward a front side (crew side), the display body 20 can be recognized by the crew (user) of the movable body.

The light source circuit board 22 is formed into a plate shape with an inflexible slightly rigid material. The light source circuit board 22, as shown in FIG. 3, includes a plurality of light sources 23, such as LEDs and bulbs lightening the plurality of warnings 21, provided at a front surface of the light source circuit board 22 corresponding to the display body 20 when the light source circuit board 22 is received in a later-described holder 31 of the receiving case 30; and a male connector 24, which is connected to a later-described female connector 41, provided at a rear surface of the light source circuit board 22 far from the display body 20.

The male connector 24, as shown in FIG. 3, is arranged at the rear surface of the light source circuit board 22 so as to be positioned in the later-described projecting portion 34 provided at the holder 31 when the light source circuit board 22 is received in the holder 31 of the receiving case 30. The male connector 24 includes a connector housing 25 formed into a box shape with insulation synthetic resin and a male terminal 26 received in the connector housing 25.

The male terminal 26 is formed into a straight stick shape with an electric conductive metal. One end of the male terminal along a lengthwise thereof is connected to the light source circuit board 22 and the other end thereof is inserted into a female terminal 43 of the later-described female connector 41 at the printed circuit board 4 so as to be electrically connected with the female terminal 43. The male terminal 26 is arranged so as to project from a top end of the projecting portion 34 when the male connector 24 is positioned in the projecting portion 34. A plurality of male terminals 26 is arranged in parallel to each other along a widthwise of the connector housing 25. The male terminal 26 corresponds to a connecting terminal in a claim.

The screening member 27 is formed into a plate shape with a light screen synthetic resin. The screening member 27 includes a plurality of passing areas 28, which the light from the light source 23 of the light source circuit board 22 is led toward the display body 20 through. The plurality of passing areas 28 is formed into a cylindrical shape so as to project from a surface of the screening member 27 corresponding to the light source circuit board 22 toward the light source circuit board 22. The screening member 27 covers respectively surroundings of the light source 23 at the light source circuit board 22 and leads the light from the light source 23 toward the corresponding warning 21.

The receiving case 30 is formed with insulation synthetic resin, and as shown in FIGS. 2-4, includes the holder 31 and a cover member 36 covering the holder 31. The holder further includes a disk-shaped bottom wall 32 and a peripheral wall 33 extending from an outer edge of the bottom wall 32 toward the crew. The holder 31 includes a projecting portion 34, which projects from the bottom wall 32 toward the chaptering plate 10, to be inserted into the insertion hole 13 of the chaptering plate 10.

The projecting portion 34 is formed into a cylindrical shape, and as shown in FIG. 3, penetrates through the bottom wall 32 to communicate a room inside the holder 31 and an outside of the holder 31. The projecting portion 34 includes a large dimensional portion 34a arranged at a side of the bottom wall 32; and a small dimensional portion 34b which both of outer dimension and inner dimension are smaller than that of the large dimensional portion 34a, and the inner dimension of the small dimensional portion 34b is similar as an outer dimension of the male connector 24; and a step portion 34c arranged between the large dimensional portion 34a and small dimensional portion 34b.

The male connector 24 is arranged in the projecting portion 34, and the male terminal 26 in the male connector 24 is positioned at a top end of the small dimensional portion 34b. The small dimensional portion 34b is inserted into the insertion hole 13 of the chaptering plate 10, and the step portion 34c abuts on the front surface of the chaptering plate 10, and thereby the holder 31 is supported at the chaptering plate 10. The projecting portion 34 is provided with a boss 35 projecting from a top end of the small dimensional portion 34b.

The cover member 36 includes a front wall 37 and a cylindrical peripheral wall 38 extending vertically from an outer edge of the front wall 37 toward the holder 31 so as to be formed into a case shape opening at a side far from the crew. The peripheral wall 38 is provided to cover an outer side of the peripheral wall 33 of the holder 31 when the cover member 36 is mounted to the holder 31, and the peripheral wall 38 forms an outline of the receiving case 30. The cover member 36 includes an exposing area 39 for exposing the front surface of the display body 20 against the crew of the movable body. The exposing area 39 is formed into a round shape so as to penetrate the front wall 37.

The printed circuit board 4 is formed into a rectangular plate shape with an inflexible slightly rigid material. As shown in FIG. 3, various electronic components, such as the plurality of LEDs 40 lightening the index member 11 and the indicating needle 12; a control unit (not shown) controlling actions of the movement 17 and the light source 23 of the display unit 3; and the mating female connector 41 to be connected with the male connector 24 of the display unit 3, are mounted at the printed circuit board 4 to be connected electrically.

Figure 5:
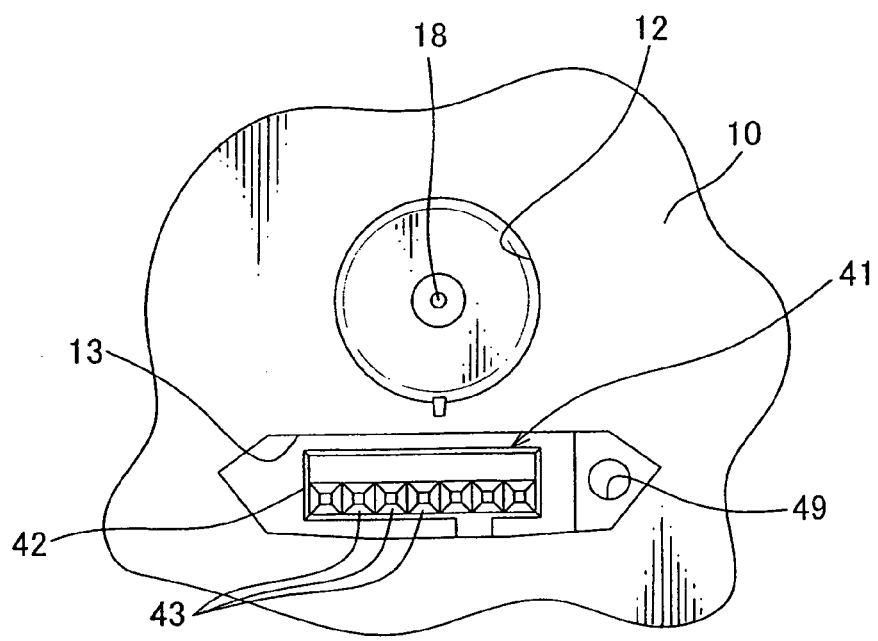
FIG. 5 is a plan view showing a main area of a chaptering plate of the first display device shown in FIG. 2.

The female connector 41, as shown in FIGS. 3-5, includes a connector housing 42 formed into a box shape with insulation synthetic resin, and a female terminal 43 received in the connector housing 42. The female terminal 43 is formed into a cylindrical shape with an electric conductive metal so as to be electrically connected with the male terminal 26 by inserting the male terminal 26 into the female terminal 43. A plurality of female terminals 43 is arranged in parallel to each other along a widthwise of the connector housing 42. The plurality of female terminals 43 is arranged at a position in which the insert direction of inserting the projecting portion 34 of the display unit 3 through the insertion hole 13 of the chaptering plate 10 and the printed circuit board 4 intersect to each other. The female terminal 43 corresponds to a terminal receiving member in claim.

The above-mentioned printed circuit board 4, as shown in FIGS. 3 and 4, is arranged in parallel to a later-described front wall 45 and the rear cover 6, and received in the instrument case 5 and the rear side of the printed circuit board 4 is covered by the rear cover 6.

The instrument case 5, as shown in FIGS. 2-4, includes a front wall 45 corresponding to the crew of the movable body and a peripheral wall 46 extending vertically from an outer edge of the front wall 45 parting from the crew so as to be formed into a box shape opening at a far side from the crew. The peripheral wall 46 forms the outline of the instrument case 5.

The front wall 45 includes a plurality of openings 47 for passing the output shaft 18 of the movement 17 and leading the light from the LEDs at the printed circuit board 4 toward the chaptering plate 10 and the indicating needle 14; and an insert portion 48, in which the project portion 34 of the display unit 3 is inserted, communicating with the insertion hole 13 of the chaptering plate 10. The insert portion 48 is formed into a cylindrical shape, and projects from the front wall 45 toward the printed circuit board 4. The insert portion 48 further includes a positioning hole 49 inside the insert portion 48.

The positioning hole 49 is arranged continuous to an inner surface of the insert portion 48 and extends in the insert portion 48 along the insert direction of inserting the projecting portion 34. When the projecting portion 34 of the display unit 3 is inserted into the insert portion 48, the boss 35 projecting from the top end of the projecting portion 34 penetrates into the positioning hole 49, so that the male terminal 26 of the male connector 24 arranged in the projecting portion 34 and the female terminal 43 of the female connector 41 arranged at the printed circuit board 4 are positioned so as to correspond to each other in the insert direction.

The above-mentioned instrument case 5 receives the printed circuit board 4 to be in parallel to the front wall 45 inside the instrument case 5. The chaptering plate 10 is stacked on the front surface (crew side) of the front wall 45, and the inside member 7 is arranged so as to place the chaptering plate 10 between the front wall 45 and the inside member 7.

The rear cover 6 is formed with insulation synthetic resin into a plate shape as shown in FIGS. 3 and 4. The rear cover 6 is mounted at a rear surface of the instrument case 5, which is farther from the crew of the movable body, so as to cover the opening of the instrument case 5.

The inside member 7 is formed with synthetic resin so as to have an opening at an area corresponding to the tachometer 2 and the display unit 3. The inside member 7 is mounted at the instrument case 5 so as to locate the chaptering plate 10 between the front wall 45 of the instrument case 5 and the inside member 7. Thereby, other areas than the tachometer 2 and a display area of the display unit 3 are screened against the crew of the movable body.

The transparent cover 8 is formed with transparent resin into a plate shape as shown in FIGS. 3 and 4. The transparent cover 8 is attached at a front side (crew side) of the inside member 7. Thereby, the transparent cover 8 covers front sides of the tachometer 2, the display unit 3 and inside member 7 for preventing that dust comes into the instrument apparatus 1.

A method of assembling the above-structured instrument apparatus 1 will be described hereafter.

First, the male connector 24 is located in the projecting portion 34 of the holder 31, and the light source circuit board 22 is arranged in the holder 31. The light source 23 is positioned in the passing area 28 of the screening member 27 and the screening member 27 is arranged at the front side of the light source circuit board 22. The display body 20 is arranged at the front side of the screening member 27. The display body 20 and the screening member 27 are stacked in order at the front side of the light source circuit board 22 and received in the holder 31. The cover member 36 is mounted to the holder 31. Thus, the display unit 3 is assembled in sub-process.

Second, the chaptering plate 10 is mounted at the front surface of the instrument case 5 so as to make the insertion hole 13 communicate with the insert portion 48 of the instrument case 5. The printed circuit board 4 is received in the instrument case 5 in parallel to the front wall 45 of the instrument case 5. After that, the rear cover 6 is attached at the instrument case 5 so as to cover the opening of the instrument case 5. The indicating needle 14 is attached at the output shaft 18 of the movement 17 so as to be arranged at the front side of the chaptering plate 10. The decorative ring 19 is arranged at the front side of the chaptering plate so as to surround the outer edge of the index member 11 of the chaptering plate 10. Thus, the tachometer 2 is assembled.

The display unit 3 is arranged to correspond to the chaptering plate 10 of the tachometer 2, and the small dimensional portion 34b of the projecting portion 34 of the display unit 3 is inserted through the insertion hole 13 of the chaptering plate 10 into the insert portion 48 of the instrument case 5. Thereby, the boss 35 arranged at the top end of the projecting portion penetrates into the positioning hole 49 provided in the insert portion 48, and the male terminal 26 of the male connector 24 arranged in the projecting portion 34 and the female terminal 43 of the female connector 41 provided at the printed circuit board 4 are positioned corresponding to each other in connecting direction.

The small dimensional portion 34b of the projecting portion 34 is further inserted into the insert portion 48, and the male terminal 26 of the male connector 24 in the projecting portion 34 is connected electrically to the female terminal 43 of the female connector 41. The step portion 34c of the projecting portion 34 abuts on the surface of the chaptering plate 10, and the holder 31 is supported at the chaptering plate 10. Thus, by inserting the projecting portion 34 through the insertion hole 13 of the chaptering plate 10, the display unit 3 is electrically connected to the printed circuit board 4 by the male terminal 26 of the male connector 24 and the female terminal 43 of the female connector 41 so as to be arranged at the front side of the chaptering plate 10.

Finally, the inside member 7 is attached at the instrument case 5 so as to locate the chaptering plate 10 between the front wall 45 of the instrument case 5 and the inside member 7. Thereafter, the transparent cover 8 is mounted at the front side (crew side) of the inside member 7 so as to cover each front side (crew side) of the tachometer 2, the display unit 3 and the inside member 7. Thus, the instrument apparatus 1 is assembled.

In this embodiment, the male terminal 26 is arranged at the top end of the projecting portion 34 and at a position, in which the insert direction of inserting the projecting portion 34 of the display unit 3 through the insertion hole 13 of the chaptering plate 10 and the printed circuit board 4 intersect. The printed circuit board 4 includes the female terminal 43 to be electrically connected to the male terminal 26.

Therefore, by inserting the projecting portion 34 of the display unit 3 through the insertion hole 13, the display unit 3 and the printed circuit 4 can be electrically connected by the male terminal 26 and the female terminal 43. Thereby, working operation of assembling the display unit 3 can be simplified. No working space for electrically connecting the display unit 3 and the printed circuit board 4 by a worker is required and the instrument apparatus 1 can be miniaturized.

The projecting portion 34 includes the boss 35 projecting from the top end of the projecting portion 34. The instrument case 5 includes the positioning hole 49, in which the boss 35 is inserted so as to position the male terminal 26 and the female terminal 43 corresponding to each other in the connecting direction when the projecting portion 34 is inserted through the insertion hole 13.

Thereby, by inserting the projecting portion 34 through the insertion hole 13, the male terminal 26 and the female terminal 43 can be positioned corresponding to each other in the connecting direction by the boss 35 and the positioning hole 49. Then, the male terminal 26 and the female terminal 43 can be connected smoothly and work operation for assembly can be improved, so that connecting error of the male terminal 26 and the female terminal 43 can be prevented.

Figure 6:
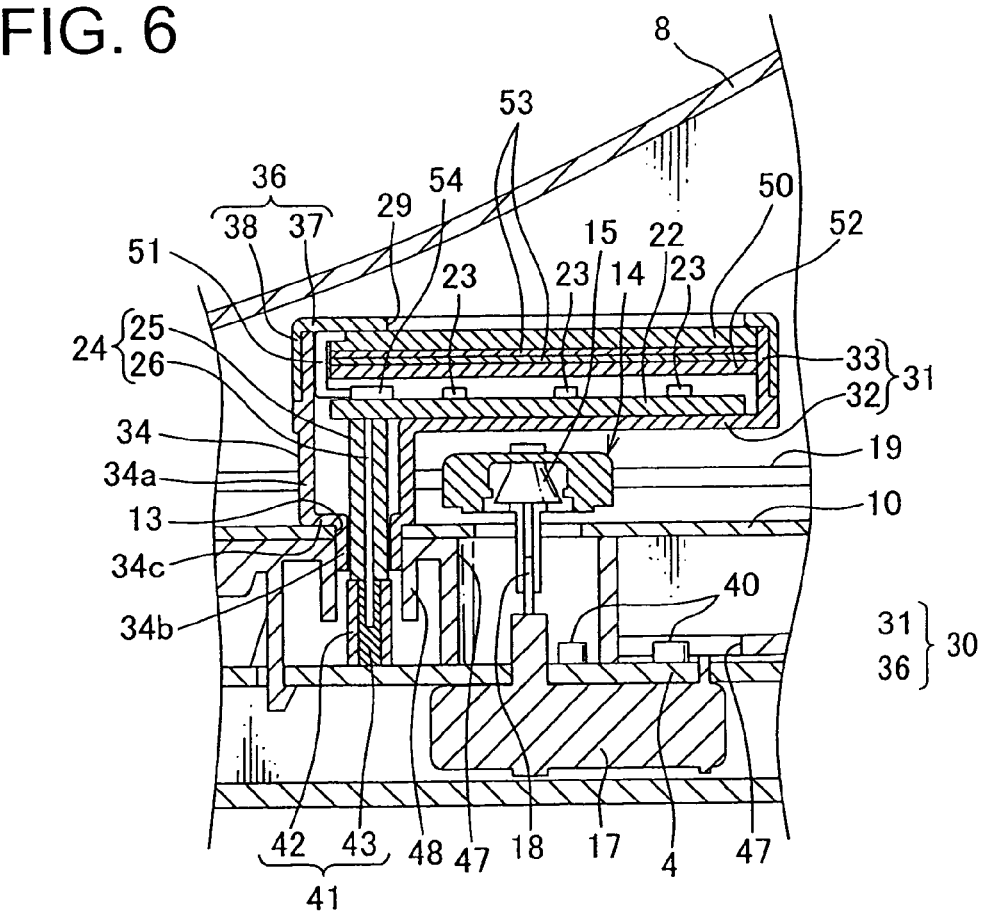
FIG. 6 is a cross-sectional view showing another embodiment of the second display device shown in FIG. 3.

In the above embodiment, the display unit 3 includes the display body 20, which indicates the plurality of warnings 21 to the crew (user) of the movable body by passing the light from the light source 23 at the light source circuit board 22 toward the front side (crew side) through the plurality of warnings 21 arranged at the surface of the display body 20. According to the present invention, the display unit 3 can include a known liquid crystal display panel 50, which can transmit light from the rear surface thereof and shows various information to adjust transmittance factor by applying voltage thereto, as shown in FIG. 6. The same marks are given to the components of the embodiment shown in FIG. 6 same as the above embodiment, and descriptions fro the components are omitted.

According to the embodiment shown in FIG. 6, in the display unit 3, the liquid crystal panel 50, a light guide 52 arranged at a side of a rear surface of the liquid crystal panel 50 apart from the crew, and a plurality of lens sheets 53 arranged between the liquid crystal panel 50 and the light guide 52 are provided at a side of front surface (crew side) of the light source circuit board 22.

A known liquid crystal device, which can pass light from the rear surface thereof, is applied as the liquid crystal panel 50. The liquid crystal panel include a connecting cable 51 led outward from the liquid crystal panel 50. A known FFC (flexible flat cable) or known FPC (flexible printed circuit) is applied as the connecting cable 51. One end of the connecting cable 51 is electrically connected to the liquid crystal panel 50, and the other end of the connecting cable 51 is electrically connected to a connector 54 arranged at the light source circuit board 22. Thus, the liquid crystal panel 50 is electrically connected through the connecting cable 51 to the connector 54 at the light source circuit board 22.

The light guide 52 is formed into a plate shape with transparent synthetic resin. The light guide 52 is arranged at the rear surface of the liquid crystal panel 50, and received between the liquid crystal panel and the light source 23 at the light source circuit board 22 in the holder 31 of the receiving case 30. The light guide 52 emits the light from the light source 23 at the light source circuit board 22 toward the liquid crystal panel 50.

The plurality of lens sheets 53 is formed into a thin film shape sized to the liquid crystal panel 50 with transparent synthetic resin. The plurality of lens sheets 53 is arranged between the liquid crystal panel 50 and the light guide 52 so as to be stacked to each other, and received in the holder 31 of the receiving case 30. The plurality of lens sheets 53 focuses the light passing through the light guide 53 from the light source 23 to the side of the front surface (crew side) of the liquid crystal panel 50.

According to the embodiment shown in FIG. 6, the liquid crystal panel 50 is electrically connected through the connecting cable 51 and the connector 54 to the light source circuit board 22, and the light source circuit board 22 is electrically connected to the printed circuit board 4 by the male terminal 26 of the male connector 24 and the female terminal 43 of the female connector 41. The liquid crystal panel 50 and the light source circuit board 22 are controlled by the control unit (not shown) at the printed circuit board 4 so as to display various information such as the transmission shift position, the traveling distance, the average speed, the fuel level, and the plurality of warnings.

According to the embodiment, the LCD (liquid crystal device) is used as the liquid crystal display 50. TFT-type liquid crystal device, DSTN-type liquid crystal device can be applied, and VDF (vacuum fluorescent display) or self-emission type display device can be applied. In this embodiment, the plurality of lens sheets 53 is stacked to be used. An optical sheet such polarizing sheet and brightness enhancing sheet can be used. A plurality of optical sheets, which has a different optical characteristics to each other, can be used.

While, in the embodiment, the present invention is described, it is not limited thereto. Various change and modifications can be made with the scope of the present invention.

The invention claimed is:

1. An instrument apparatus, comprising:
a first display device comprising a chaptering plate provided at a front surface of the chaptering plate with an index member indicating a condition of a movable body in cooperation with an indicating needle;
a second display device arranged at a side of the front surface of the chaptering plate;
a circuit board arranged at a side of a rear surface of the chaptering plate and driving the second display device;
wherein the second display device comprises a projecting portion projecting toward the chaptering plate and a connecting terminal arranged at a top end of the projecting portion,
wherein the chaptering plate comprises an insertion hole formed into a similar shape as an outline of the projecting portion, in which the projecting portion is inserted,
wherein the circuit board is arranged at a position, in which an insert direction of inserting the projecting portion through the insertion hole and the circuit board intersect, and comprises a terminal receiving member to be fitted and electrically connected with the connecting terminal, and
wherein when the projecting portion is inserted into the insertion hole, the connecting terminal arranged at the top end of the projecting portion is electrically connected to the terminal receiving member.

2. The instrument apparatus according to claim 1, further comprising an instrument case, on a front surface of which the chaptering plate is mounted, receiving the circuit board inside the instrument case,
wherein the projecting portion is provided with a projecting boss at the top end of the projecting portion,
wherein the instrument case comprises a positioning hole, in which the projecting boss is inserted so as to position the connecting terminal and the terminal receiving member corresponding to each other along the insert direction when the projecting portion is inserted in the insertion hole.

* * * * *